United States Patent
Kröhnke et al.

(10) Patent No.: US 7,083,743 B2
(45) Date of Patent: Aug. 1, 2006

(54) MIXTURE OF PHOSPHANES AND CHROMANE DERIVATIVES

(75) Inventors: Christoph Kröhnke, Breisach-Oberrimsingen (DE); Peter Staniek, Binzen (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 10/149,682

(22) PCT Filed: Dec. 18, 2000

(86) PCT No.: PCT/IB00/01897

§ 371 (c)(1),
(2), (4) Date: Jun. 13, 2002

(87) PCT Pub. No.: WO01/46310

PCT Pub. Date: Jun. 28, 2001

(65) Prior Publication Data

US 2003/0020048 A1    Jan. 30, 2003

(30) Foreign Application Priority Data

Dec. 20, 1999 (DE) ................................ 199 61 464

(51) Int. Cl.
*C09K 15/08* (2006.01)
*C09K 15/32* (2006.01)
*C08K 5/1545* (2006.01)
*C08K 5/50* (2006.01)
*C08K 5/138* (2006.01)

(52) U.S. Cl. ............................ 252/400.24; 252/400.2; 252/404; 252/182.29; 524/110; 524/116; 524/121; 524/154

(58) Field of Classification Search ............. 252/400.2, 252/400.24, 404, 407, 182.29; 524/110, 524/116, 121, 154
See application file for complete search history.

(56) References Cited

U.S. PATENT DOCUMENTS

| | | | |
|---|---|---|---|
| 3,637,907 A | 1/1972 | Mathis et al. | |
| 4,123,465 A * | 10/1978 | Valentine, Jr. ................ | 568/13 |
| 4,511,685 A | 4/1985 | Nissen et al. ................ | 524/110 |
| 4,536,350 A | 8/1985 | Weferling | |
| 4,590,146 A * | 5/1986 | Wallbillich ............... | 430/281.1 |
| 5,003,108 A | 3/1991 | Stelzer et al. | |
| 5,057,618 A | 10/1991 | Herrmann et al. | |
| 5,155,274 A | 10/1992 | Herrmann et al. | |
| 5,488,079 A | 1/1996 | Staniek | |
| 5,627,256 A | 5/1997 | Meier et al. ................. | 528/198 |
| 6,310,220 B1 | 10/2001 | Schmitter et al. ........... | 549/307 |
| 6,465,548 B1 * | 10/2002 | Inoue et al. ................. | 524/110 |
| 6,509,399 B1 * | 1/2003 | Gupta et al. ................. | 524/100 |
| 6,864,304 B1 * | 3/2005 | Staniek ........................ | 524/121 |

FOREIGN PATENT DOCUMENTS

| | | |
|---|---|---|
| DE | 42 33 973 | 4/1993 |
| DE | 44 45 786 | 6/1996 |
| DE | 195 26 471 | 1/1997 |
| DE | 196 38 924 | 4/1997 |
| DE | 196 27 809 | 1/1998 |
| DE | 196 29 691 | 1/1998 |
| DE | 198 08 938 | 10/1998 |
| EP | 30 10 505 | 10/1981 |
| EP | 0 320 761 | 6/1989 |
| GB | 2 276 387 | 9/1994 |
| WO | 97/49758 | 12/1997 |

OTHER PUBLICATIONS

English Abstract for EP 0320761, Jun. 21, 1989, Haas, et al.
English Abstract for DE 4233973, Apr. 15, 1993, Sandoz-Patent GmbH.
English Abstract for DE 19526471, Jan. 23, 1997, Aumuller, et al.
English Abstract for DE 19638924, Apr. 3, 1997, Staniek.
English Abstract for DE 19627809, Jan. 15, 1998, Marschner, et al.
English Abstract for DE 19629691, Jan. 29, 1998, Kohler, et al.

* cited by examiner

*Primary Examiner*—Joseph D. Anthony
(74) *Attorney, Agent, or Firm*—Anthony A. Bisulca

(57) ABSTRACT

The invention relates to a synergistic mixture comprising
a) at least one compound from the group which consists of the phosphanes of the formula (I), (di/oligo)phosphanes of the formulae (II) and (III) and cyclophosphanes of the formula (IV)
and
b) at least one 6-hydroxychromane derivative of the general formula (V)
and also to a process which stabilizes polymers with respect to thermooxidative degradation by addition and incorporation of this synergistic mixture.

5 Claims, No Drawings

MIXTURE OF PHOSPHANES AND CHROMANE DERIVATIVES

This application is a 371 of PCT/IB00/01897 filed Dec. 18, 2000.

The invention relates to synergistic mixtures which comprise phosphanes, (di/oligo)-phosphanes, cyclophosphanes as component 1 and 6-hydroxychromane derivatives as component 2, and also to a process which uses these mixtures to stabilize polymers with respect to degradation initiated by heat or by mechanical stress.

When polymers are processed to give the final products they are exposed, inter alia, to high temperatures. This can have adverse effects on the melt viscosity and physical properties of the polymers, and also on the appearance of the final products produced from them. Suitable stabilizers or stabilizer systems are therefore required in order to minimize oxidation, chain breakage or discoloration.

However, many of the known stabilizers or stabilizer systems have disadvantages, e.g. insufficient efficacy and shortcomings with respect to other requirements, e.g. inadequate stability with respect to hydrolysis, tendency to develop colour, very limited compatibility with the polymers to be stabilized and restricted thermal stability. Due to limited compatibility, it is desirable to have lower concentrations of these stabilizers in the polymers, this being achievable by using more efficacious stabilizer systems.

An object of the present patent application is therefore to provide novel stabilizer systems which give better performance.

This object is achieved by way of the synergistic stabilizer mixture of the invention, which is an improved processing stabilizer for polymers since even when used in small amounts it inhibits the damaging reactions caused by heat.

The invention provides a mixture comprising
a) at least one compound from the group of compounds of the formulae (I) to (IV) [hereinafter termed component 1]

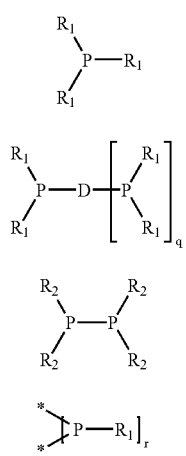

and
b) at least one compound of the general formula (V) [hereinafter termed component 2]

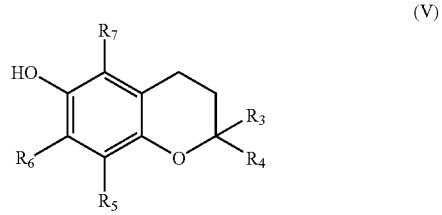

where, independently of one another, $R_1$ is $C_1$–$C_{24}$-alkyl (linear or branched), $C_5$–$C_{30}$-cycloalkyl $C_1$–$C_{30}$-alkylaryl, $C_6$–$C_{24}$-aryl, $C_4$–$C_{24}$-heteroaryl, $C_6$–$C_{24}$-aryl or $C_4$–$C_{24}$-heteroaryl (mono- or polysubstituted by the groups $C_1$–$C_{18}$-alkyl (linear or branched)), $C_5$–$C_{12}$-cycloalkyl or $C_1$–$C_{18}$-alkoxy;

$R_2$ is $C_4$–$C_{24}$-alkyl (linear or branched), $C_5$–$C_{30}$-cycloalkyl, $C_1$–$C_{30}$-alkylaryl, $C_6$–$C_{24}$-aryl, $C_4$–$C_{24}$-heteroaryl, $C_6$–$C_{24}$-aryl or $C_4$–$C_{24}$-heteroaryl (mono- or polysubstituted by the groups $C_1$–$C_{18}$-alkyl (linear or branched)), $C_5$–$C_{12}$-cycloalkyl or $C_1$–$C_{18}$-alkoxy;

$R_3$ is hydrogen, $C_1$–$C_{24}$-alkyl (linear or branched), $C_3$–$C_{12}$-cycloalkyl, $C_1$–$C_{24}$-alkenyl (mono- or polyunsaturated, linear or branched);

$R_4$, $R_5$, $R_6$, $R_7$ are hydrogen, $C_1$–$C_{24}$-alkyl (linear or branched), $C_3$–$C_{12}$-cycloalkyl, $C_1$–$C_{24}$-alkenyl (mono- or polyunsaturated, linear or branched), carboxy groups —COOR$_8$, succinyl groups —CH(COOR$_8$)—CH$_2$—COOR$_8$;

$R_8$ is hydrogen, $C_1$–$C_{20}$-alkyl (linear or branched), $C_4$–$C_{12}$-cycloalkyl or $C_2$–$C_{20}$-polyethylene glycol groups;

D is $C_1$–$C_{30}$-alkylene (linear or branched), $C_2$–$C_{30}$-alkylidene $C_5$–$C_{12}$-cyclo-alkylene or $C_6$–$C_{24}$-arylene or $C_4$–$C_{24}$-heteroarylene, $C_6$–$C_{24}$-arylene or $C_4$–$C_{24}$-heteroarylene (mono- or polysubstituted by $C_1$–$C_{18}$-alkyl (linear or branched)), $C_5$–$C_{12}$-cycloalkyl or $C_1$–$C_{18}$-alkoxy;

q is from 1 to 5;

r is from 3 to 6, the groups P-$R_1$ in the formula (IV) being a constituent of a phosphacycle indicated by * on the bonds emanating from P.

Preference is given to mixtures in which the radicals R and the alphabetical characters in the formulae relating to compounds (I) to (V) have the following meanings:

$R_1'$ is $C_8$–$C_{24}$-alkyl (linear or branched), $C_6$–$C_{12}$-cycloalkyl, $C_2$–$C_{24}$-alkylaryl, $C_6$–$C_{24}$-aryl or $C_4$–$C_{18}$-heteroaryl, $C_6$–$C_{24}$-aryl or heteroaryl (mono- or polysubstituted by the groups $C_1$–$C_{12}$-alkyl (linear or branched)), $C_5$–$C_8$-cycloalkyl or $C_1$–$C_{12}$-alkoxy;

$R_2'$ is $C_6$–$C_{18}$-alkyl (linear or branched), $C_5$–$C_{12}$-cycloalkyl $C_1$–$C_{18}$-alkylaryl, $C_6$–$C_{24}$-aryl, $C_4$–$C_{18}$-heteroaryl, $C_6$–$C_{24}$-aryl or $C_4$–$C_{18}$-heteroaryl (mono- or polysubstituted by the groups $C_1$–$C_{12}$-alkyl (linear or branched)), $C_5$–$C_8$-cycloalkyl or $C_1$–$C_{12}$-alkoxy;

$R_3'$ is $C_1$–$C_{20}$-alkyl (linear or branched), $C_4$–$C_8$-cycloalkyl, $C_1$–$C_{20}$-alkenyl (mono- or polyunsaturated, linear or branched);

$R_4'$, $R_5'$, $R_6'$, $R_7'$ are hydrogen, $C_1$–$C_{20}$-alkyl (linear or branched), $C_4$–$C_8$-cycloalkyl, $C_1$–$C_{20}$-alkenyl (mono- or polyunsaturated, linear or branched), carboxy groups, —COOR$_8'$, succinyl groups —CH(COOR$_8'$)—CH$_2$—COOR$_8'$;

$R_8'$ is hydrogen, $C_1$–$C_{12}$-alkyl (linear or branched), $C_4$–$C_8$-cycloalkyl or $C_4$–$C_{16}$-polyethylene glycol groups;

D' is $C_1$–$C_{24}$-alkylene (linear or branched), $C_2$–$C_{24}$-alkylidene, $C_5$–$C_8$-cyclo-alkylene, or $C_6$–$C_{24}$-arylene or $C_4$–$C_{18}$-heteroarylene, $C_6$–$C_{24}$-arylene or $C_4$–$C_{18}$-heteroarylene (mono- or polysubstituted by $C_1$–$C_{18}$-alkyl (linear or branched)), $C_5$–$C_8$-cycloalkyl or $C_1$–$C_{12}$-alkoxy;

q' is from 1 to 4;

r' is from 4 to 5, the groups P—$R_1$ in the formula (IV) being a constituent of a phosphacycle indicated by * on the bonds emanating from P.

Particular preference is given to mixtures in which the radicals R and the alphabetic characters in the formulae relating to compounds (I) to (V) have the following meanings:

$R_1$" is $C_6$–$C_{24}$-aryl or $C_4$–$C_{18}$-heteroaryl, $C_6$–$C_{24}$-aryl or $C_4$–$C_{18}$-heteroaryl (mono- or polysubstituted by the groups $C_1$–$C_{12}$-alkyl (linear or branched)), $C_5$–$C_8$-cycloalkyl or $C_1$–$C_{12}$-alkoxy;

$R_2$" is $C_8$–$C_{18}$-alkyl (linear or branched), $C_5$–$C_8$-cycloalkyl, $C_1$–$C_{18}$-alkylaryl, $C_6$–$C_{12}$-aryl, $C_4$–$C_{18}$-heteroaryl, $C_6$–$C_{12}$-aryl or $C_4$–$C_{18}$-heteroaryl (mono- or polysubstituted by the groups $C_1$–$C_{12}$-alkyl (linear or branched)), $C_6$–$C_8$-cycloalkyl or $C_1$–$C_8$-alkoxy;

$R_3$" is $C_1$–$C_{16}$-alkyl (linear or branched), $C_5$–$C_8$-cycloalkyl, $C_1$–$C_{16}$-alkenyl (mono- or polyunsaturated, linear or branched);

$R_4$", $R_5$", $R_6$", $R_7$" are hydrogen, $C_1$–$C_{16}$-alkyl (linear or branched), $C_5$–$C_8$-cycloalkyl, $C_1$–$C_{16}$-alkenyl (mono- or polyunsaturated, linear or branched); —COOR$_8$", —CH(COOR$_8$")—CH$_2$—COOR$_8$";

$R_8$" is hydrogen, $C_1$–$C_8$-alkyl (linear or branched), $C_5$–$C_8$-cycloalkyl or $C_6$–$C_{12}$-polyethylene glycol groups;

D" is $C_1$–$C_{18}$-alkylene (linear or branched), $C_2$–$C_{24}$-alkylidene, $C_5$–$C_8$-cyclo-alkylene, or $C_6$–$C_{24}$-arylene or $C_4$–$C_{18}$-heteroarylene, $C_6$–$C_{24}$-arylene or $C_4$–$C_{18}$-heteroarylene (mono- or polysubstituted by $C_1$–$C_{18}$-alkyl (linear or branched)), $C_5$–$C_8$-cycloalkyl or $C_1$–$C_{12}$-alkoxy;

q" is from 1 to 4;

r" is from 4 to 5, the groups P-$R_1$ in the formula (IV) being a constituent of a phosphacycle indicated by * on the bonds emanating from P.

Particularly suitable mixtures are all of those which can be formed by combining one or more of the components 1 and 2 mentioned below:

---

Component 1 triphenylphosphane
tris(2-methylphenyl)phosphane
tris(4-methylphenyl)phosphane
tris(2-methoxyphenyl)phosphane
tris(4-methoxyphenyl)phosphane
tetracyclohexylcyclotetraphosphane
tetra-tert-butylcyclotetraphosphane
tetrabiphenylylcyclotetraphosphane
tetraphenylcyclotetraphosphane
pentaphenylcyclopentaphosphane
pentabiphenylylcyclopentaphosphane
tetraphenyldiphosphane
tetracyclohexyldiphosphane
bis(diphenylphosphino)methane
1,2-bis(diphenylphosphino)ethane
1,3-bis(diphenylphosphino)propane
1,4-bis(diphenylphosphino)butane
1,5-bis(diphenylphosphino)pentane
1,6-bis(diphenylphosphino)hexane
1,8-bis(diphenylphosphino)octane -continued 1,3-bis(diphenylphosphino)-2,2-dimethylpropane
1,1,1-tris(diphenylphosphinomethyl)methane
1,1,1-tris(diphenylphosphinomethyl)ethane
1,1,1-tris(diphenylphosphinomethyl)propane
1,1,1-tris(diphenylphosphinomethyl)butane
1,1,1-tris(diphenylphosphinomethyl)-1-phenylmethane
1,3-bis(diphenylphosphinomethyl)-2,2-diphenylphosphinopropane
1,3-bis(diphenylphosphinomethyl)-2,2-diethylphosphinopropane
1,3-bis(diphenylphosphino)-2-methylpropane Component 2

2,5,7,8-tetramethyl-2-(4',8',12'-trimethyltridecyl)chroman-6-ol (α-tocopherol)
2,5,8-trimethyl-2-(4',8',12'-trimethyltridecyl)chroman-6-ol (β-tocopherol)
2,7,8-trimethyl-2-(4',8',12'-trimethyltridecyl)chroman-6-ol (γ-tocopherol)
2,8-dimethyl-2-(4',8',12'-trimethyltridecyl)chroman-6-ol (δ-tocopherol)
3,4-dihydro-2,2,5,7,8-pentamethyl-2H-1-benzopyran-6-ol
6-hydroxy-2,5,7,8-tetramethylchromane-2-carboxylic acid (Trolox)

---

Among these mixtures, very particular preference is given to the following mixtures of components 1 and 2:

A) where component 1 is triphenylphosphane and component 2 is α-tocopherol;

B) where component 1 is triphenylphosphane and component 2 is 3,4-dihydro-2,2,5,7,8-pentamethyl-2H-1-benzopyran-6-ol;

C) where component 1 is tris(4-methylphenyl)phosphane and component 2 is α-tocopherol;

D) where component 1 is tris(4-methylphenyl)phosphane and component 2 is 3,4-dihydro-2,2,5,7,8-pentamethyl-2H-1-benzopyran-6-ol;

E) where component 1 is tris(4-methoxyphenyl)phosphane and component 2 is α-tocopherol;

F) where component 1 is tris(4-methoxyphenyl)phosphane and component 2 is 3,4-dihydro-2,2,5,7,8-pentamethyl-2H-1-benzopyran-6-ol;

G) where component 1 is tris(2-methylphenyl)phosphane and component 2 is α-tocopherol;

H) where component 1 is tris(2-methylphenyl)phosphane and component 2 is 3,4-dihydro-2,2,5,7,8-pentamethyl-2H-1-benzopyran-6-ol;

I) where component 1 is tris(2-methoxyphenyl)phosphane and component 2 is α-tocopherol;

J) where component 1 is tris(2-methoxyphenyl)phosphane and component 2 is 3,4-dihydro-2,2,5,7,8-pentamethyl-2H-1-benzopyran-6-ol;

K) where component 1 is tetracyclohexylcyclotetraphosphane and component 2 is α-tocopherol, L) where component 1 is tetracyclohexylcyclotetraphosphane and component 2 is 3,4-dihydro-2,2,5,7,8-pentamethyl-2H-1-benzopyran-6-ol;

M) where component 1 is bis(diphenylphosphino)methane and component 2 is α-toco-pherol;

N) where component 1 is bis(diphenylphosphino)methane and component 2 is 3,4-dihydro-2,2,5,7,8-pentamethyl-2H-1-benzopyran-6-ol;

O) where component 1 is 1,3-bis(diphenylphosphino)propane and component 2 is α-tocopherol;

P) where component 1 is 1,3-bis(diphenylphosphino)propane and component 2 is 3,4-dihydro-2,2,5,7,8-pentamethyl-2H-1-benzopyran-6-ol;

Q) where component 1 is 1,3-bis(diphenylphosphino)-2,2-dimethylpropane and component 2 is α-tocopherol;

R) where component 1 is 1,3-bis(diphenylphosphino)-2,2-dimethylpropane and component 2 is 3,4-dihydro-2,2,5,7,8-pentamethyl-2H-1-benzopyran-6-ol;

S) where component 1 is 1,1,1-tris(diphenylphosphinomethyl)ethane and component 2 is α-tocopherol;

T) where component 1 is 1,1,1-tris(diphenylphosphinomethyl)ethane and component 2 is 3,4-dihydro-2,2,5,7,8-pentamethyl-2H-1-benzopyran-6-ol;

U) where component 1 is 1,1,1-tris(diphenylphosphinomethyl)propane and component 2 is α-tocopherol;

V) where component 1 is 1,1,1-tris(diphenylphosphinomethyl)propane and component 2 is 3,4-dihydro-2,2,5,7,8-pentamethyl-2H-1-benzopyran-6-ol.

Known mixtures based on commercially available stabilizers (phosphites/phosphonites) cannot achieve sufficient stabilization. In contrast, it is possible to use very small amounts of the components of the mixtures of the invention, sometimes less than 0.01% by weight, based on the polymeric material. Producers and users of these stabilized polymers can achieve an advantage in both economic and environmental terms through these markedly reduced usage concentrations of stabilizers.

Depending on the requirements profile placed upon the final products and the nature of the polymers to be stabilized, ideal stabilization can be achieved by varying the ratio of the two components.

The quantitative proportions of component 1 to component 2 in the mixture of the invention are preferably in the range from 50:1 to 2:1, with preference from 20:1 to 15:1, particularly preferably from 15:1 to 1:1.

Each of the components 1 and 2 may be composed either of one or of two or more compounds of the same component group.

Based on the polymeric material to be stabilized, the amounts used of the mixtures of components 1 and 2 are from 0.001 to 2% by weight, preferably from 0.005 to 1% by weight, particularly preferably from 0.0075 to 0.75% by weight.

Mixtures of components 1 and 2 may be prepared by simple mixing, by mixing in the melt, by dissolving or dispersing one component in the other liquid or molten component, by mixing two melts or by melting the materials together, where necessary, with a subsequent cooling step in each case. Mixtures of the invention are likewise obtained by mixing solutions of the components in suitable solvents and concentrating these by evaporation. The mixtures may be prepared either by a batch process in suitable apparatus, e.g. various mixers or reactors, etc., or else continuously, e.g. in extruders, continuous mixers, kneaders or roll mills. A suitable commercial form may then be prepared—if this further process is necessary—by compacting, pelletization, pressing, extrusion, or some other method.

The invention also provides a process which stabilizes polymeric materials with respect to thermooxidative degradation. This process encompasses the addition and incorporation of a stabilizing amount of the mixture of the invention in solid or molten form, in solution (preferably as liquid concentrate), in a mixture with other additives in the form of powder blends, in extrudates or in other commercial forms, as a compounded material (mixture of a polymer with a mixture of the invention and other additives, e.g. acid scavengers (e.g. metal soaps, dihydrotalcites, etc.), or with sterically hindered phenols, in the form of powder blends, extrudates or other commercial forms) or else as a solid masterbatch composition in amounts which achieve a stabilizer concentration of from 0.001 to 2% by weight, preferably from 0.005 to 1% by weight, particularly preferably from 0.0075 to 0.75% by weight, based on the polymeric material to be stabilized.

A liquid concentrate here encompasses from 10 to 80% by weight of a mixture of the invention and from 90 to 20% by weight of a solvent.

A masterbatch composition here (also termed solid basecompound) encompasses from 5 to 80% by weight, preferably from 10 to 70% by weight, particularly preferably from 15 to 40% by weight, of a mixture of the invention and from 95 to 20% by weight, preferably from 90 to 30% by weight, particularly preferably from 85 to 60% by weight, of a polymeric material which is identical or compatible with the polymeric material to be stabilized. The weights of the mixture of the invention present in a corresponding compounded material are the same as those in a masterbatch composition, but there is a reduction in the weight of the polymeric material corresponding to the amount of the other additives.

All of the components of the mixture of the invention may be prepared from known compounds using known methods.

The mixtures of the invention made from components 1 and 2 may be used as processing stabilizers for polymeric materials, preferably for 1. polymers of mono- and diolefins, e.g. polypropylene, polyisobutylene, poly-1-butene, poly-4-methyl-1-pentene, polyisoprene or polybutadiene, and also polymers of cycloolefins, e.g. of cyclopentene or norbornene; also polyethylene (where appropriate crosslinked), e.g. high-density polyethylene (HDPE), low-density polyethylene (LDPE), linear low-density polyethylene (LLDPE), branched low-density polyethylene (VLDPE) Polyolefins, i.e. polymers of monoolefins, in particular polyethylene and polypropylene, may be prepared by various processes, in particular using the following methods:
  a) free-radical polymerization (normally under high pressure and at elevated temperature)
  b) catalytic polymerization using a catalyst that normally contains one or more metals of group IVb, Vb, VIb or VIII of the Periodic Table. These metals usually have one or more ligands, such as oxides, halides, alcoholates, esters, ethers, amines, alkyls, alkenyls and/or aryls that may be either π- or σ-coordinated. These metal complexes may be in the free form or fixed on substrates, for example on activated magnesium chloride, titanium chloride, alumina or silicon oxide. These catalysts may be soluble or insoluble in the polymerization medium The catalysts can be active as such in the polymerization or further activators may be used, for example metal alkyls, metal hydrides, metal alkyl halides, metal alkyl oxides or metal alkyloxanes, the metals being elements of groups Ia, IIa and/or IIIa of the Periodic Table. The activators may be modified, for example, with further ester, ether, amine or silyl ether groups. These catalyst systems are usually termed Phillips, Standard Oil Indiana, Ziegler (-Natta), TNZ (DuPont), metallocene or single site catalysts (SSC).
2. Mixtures of the polymers mentioned under 1), e.g. mixtures of polypropylene with polyisobutylene, polypropylene with polyethylene (e.g. PP/HDPE, PP/LDPE, PP/LLDPE) and mixtures of various grades of polyethylene (e.g. LDPE/HDPE).
3. Copolymers of monoolefins and diolefins with each other or with other vinyl monomers, for example ethylene-propylene copolymers, linear low-density polyethylene (LLDPE) and mixtures thereof with low-density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene and isoprene copolymers, ethylene-alkyl acrylate copolymers, ethylene-alkyl methacrylate copolymers, ethylene-vinyl acetate copolymers and their copolymers with carbon monoxide, or ethylene-acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned under 1), for example polypropylene-ethylene-propylene copolymers, LDPE-ethylene-vinyl acetate copolymers, LDPE-ethylene-acrylic acid copolymers, LLDPE-ethylene-vinyl acetate copolymers, LLDPE-ethylene-acrylic acid copolymers and alternating or random polyalkylene-carbon monoxide copolymers and mixtures thereof with other polymers, for example polyamides.

4. Hydrocarbon resins (for example $C_5$–$C_9$) including hydrogenated modifications thereof (e.g. tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methyl acrylate; mixtures of high impact strength of styrene copolymers and another polymer, for example a polyacrylate, a diene polymer or an ethylene-propylene-diene terpolymer; and block copolymers of styrene, such as styrene-butadiene-styrene, styrene-isoprene-styrene, styrene-ethylene/butylene-styrene or styrene-ethylene/propylene-styrene.

7. Graft copolymers of styrene or α-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for example the copolymer mixtures known as ABS, MBS, ASA or AES polymers.

8. Halogen-containing polymers, such as polychloroprene, chlorinated rubber, chlorinated or sulphochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.

9. Polymers derived from α,α-unsaturated acids and derivatives thereof, such as polyacrylates and polymethacrylates, polyacrylonitriles, polyacrylamides and polymethyl methacrylates impact-modified with butyl acrylate.

10. Copolymers of the monomers mentioned under 9) with each other or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in section 1.

12. Homopolymers and copolymers of cyclic ethers, such as polyalkylene glycols, polyethylene oxide, polypropylene oxide or copolymers thereof with bisglycidyl ethers.

13. Polyacetals such as polyoxymethylene and those polyoxymethylenes which contain comonomers, for example ethylene oxide; polyacetals modified with thermoplastic polyurethanes, acrylates or MBS.

14. Polyphenylene oxides and sulphides, and mixtures thereof with styrene polymers or polyamides.

15. Polyurethanes derived from hydroxyl-terminated polyethers, polyesters and polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, such as polyamide 4, 6, 6/6, 6/10, 6/9, 6/12, 4/6, 12/12, 11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide, block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. As well as polyamides or copolyamides modified with EPDM or ABS; and polyamides condensed during processing (RIM polyamide systems).

17. Polyureas, polyimides, polyamide-imides and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, as well as block polyether-esters derived from hydroxyl-terminated polyethers; and also polyesters modified with polycarbonates or MBS.

19. Polycarbonates and polyester carbonates.

20. Polysulphones, polyether sulphones and polyether ketones.

21. Crosslinked polymers derived from aldehydes on the one hand and phenols, urea or melamine on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example from epoxy acrylates, urethane acrylates or polyester acrylates.

25. Alkyd resins, polyester resins and acrylic resins crosslinked with melamine resins, urea resins, polyisocyanates or epoxy resins.
26. Crosslinked epoxy resins which derive from polyepoxides, e.g. from bis-glycidyl ethers or from cycloaliphatic diepoxides.
27. Natural polymers such as cellulose, natural rubber, gelatin and derivatives thereof which have been chemically modified in a polymer-homologous manner, for example cellulose acetates, cellulose propionates and cellulose butyrates, or the cellulose ethers such as methyl cellulose; as well as rosins and derivatives.
28. Mixtures (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/PE-HD, PA/PP, PA/PPO.
29. Natural and synthetic organic substances which constitute pure monomeric compounds or mixtures thereof, examples being mineral oils, animal or vegetable fats, oils and waxes, or oils, waxes and fats based on synthetic esters (e.g. phthalates, adipates, phosphates or trimellitates), and also blends of synthetic esters with mineral oils in any desired proportion by weight, as are employed, for example, as spin finishes, and aqueous emulsions thereof.
30. Aqueous emulsions of natural or synthetic rubbers, such as natural rubber latex or latices of carboxylated styrene-butadiene copolymers.

Particularly preferred polymers to be stabilized are polyolefins, polyurethanes and polycarbonates These polymers may comprise other additives, e.g. antioxidants, light stabilizers (UV absorbers and/or HALS compounds and/or UV quenchers), metal deactivators, peroxide degraders, polyamide stabilizers, basic co-stabilizers, nucleating agents, fillers, reinforcing agents, plasticizers, lubricants, emulsifiers, pigments and dyes, optical brighteners, flame retardants, antistats, blowing agents, peroxides, hydroxylamines, polyalcohols, nitrones, colour improvers, thiosynergists, rheology additives, dispersing agents, etc.

These further additives may be added to the polymers prior to, together with or after the addition of the mixture of the invention. The feed here of these additives, and also of the mixture of the invention, may be in the form of a solid, or a solution or melt, or else in the form of solid or liquid mixtures or masterbatches/concentrates, using batch operation or else continuously.

The invention also encompasses all of the products obtainable by moulding the abovementioned polymers which comprise a mixture of the invention and comprise at least one of the abovementioned other additives.

The advantageous action of the mixture of the invention is illustrated by the examples below

EXAMPLE 1

To prepare a polymer stabilized according to the invention, 100.00 parts of polypropylene (Eltex P HL 001PF, Solvay)
0.05 part of Hostanox O-10 (sterically hindered phenol, Clariant AG)
0.10 part of calcium stearate and
0.04 part of 1,3-bis(diphenylphosphino)-2,2-dimethylpropane (component 1) and
0.01 part of α-tocopherol (Ronotec 201, Hoffman-La Roche) (component 2)

are mixed in a Kenwood mixer and then homogenized by non-aggressive extrusion in a single-screw extruder (Collin, 210° C., 80 rpm, compression ratio 1:3, die 4 mm), and the resultant polymer extrudate is pelletized. To study melt flow stabilization and colour stabilization, the stabilized polymers are extruded five times at 270° C. in a single-screw extruder (Göttfert Extrusiometer, 50 rpm, compression ratio 1:3, die 2 mm). After the 5th pass the melt flow index (MFI) is determined to ASTM 1238 cond. L (230° C./2.16 kg)

EXAMPLE 2

Using a method similar to that of Example 1, another stabilized polymer of the invention is prepared from 100.00 parts of polypropylene (Eltex P HL 001PF, Solvay)
0.05 part of Hostanox O-10 (sterically hindered phenol, Clariant AG)
0.10 part of calcium stearate and
0.04 part of 1,1,1-tris(diphenylphosphinomethyl)ethane (component 1) and
0.01 part of α-tocopherol (Ronotec 201, Hoffman-La Roche) (component 2).

EXAMPLE 3

Using a method similar to that of Example 1, another stabilized polymer of the invention is prepared from 100.00 parts of polypropylene (Eltex P HL001 PF, Solvay)
0.05 part of Hostanox O-10 (sterically hindered phenol, Clariant AG)
0.10 part of calcium stearate and
0.04 part of 1,1,1-tris(diphenylphosphinomethyl)propane (component 1) and
0.01 part of α-tocopherol (Ronotec 201, Hoffman-La Roche) (component 2).

The following comparative mixtures are prepared:

EXAMPLE 4

Comparative Mixture Without Component 1

Using a method based on Example 1, a polymer stabilized according to the prior art is prepared for comparative purposes from 100.00 parts of polypropylene (Eltex P HL 001PF, Solvay)
0.05 part of Hostanox O-10 (sterically hindered phenol, Clariant AG)
0.10 part of calcium stearate and
0.05 part of α-tocopherol (Ronotec 201, Hoffman-La Roche).

EXAMPLE 5

Comparative Mixture Without Component 2

Using a method based on Example 1, a polymer stabilized according to the prior art is prepared for comparative purposes from 100.00 parts of polypropylene (Eltex P HL 001PF, Solvay)
0.05 part of Hostanox O-10 (sterically hindered phenol, Clariant AG)
0.10 part of calcium stearate and
0.05 part of 1,3-bis(diphenylphosphino)-2,2-dimethylpropane.

EXAMPLE 6

Comparative Mixture Without Component 2

Using a method based on Example 1, a polymer stabilized according to the prior art is prepared for comparative purposes from 100.00 parts of polypropylene (Eltex P HL 001PF, Solvay)
0.05 part of Hostanox O-10 (sterically hindered phenol, Clariant AG)
0.10 part of calcium stearate and
0.05 part of 1,1,1-tris(diphenylphosphinomethyl)ethane.

EXAMPLE 7

Comparative Mixture Without Component 2

Using a method based on Example 1, a polymer stabilized according to the prior art is prepared for comparative purposes from 100.00 parts of polypropylene (Eltex P HL 001PF, Solvay)
0.05 part of Hostanox O-10 (sterically hindered phenol, Clariant AG)
0.10 part of calcium stearate and
0.05 part of 1,1,1-tris(diphenylphosphinomethyl)propane.

The results obtained are given in the table below.

TABLE 1

Results of melt flow stabilization measurements on a polypropylene stabilized with 0.05 part of stabilizer (mixture).

| Example | Melt Flow Index (230° C., 2.16 kg) [g/10 min] 5th pass |
|---|---|
| 1 | 4.43 |
| 2 | 3.41 |
| 3 | 3.39 |
| 4 | 6.41 |
| 5 | 4.60 |
| 6 | 4.02 |
| 7 | 3.99 |

The results show that when a prior art stabilizer (Ronotec 201, Example 4; component 2) which is in itself a relatively poor stabilizer is added to another prior art stabilizer (Examples 5–7; component 1) the result is synergistic mixtures of the invention (Examples 1–3) with improved stabilization properties (corresponding to lower MFI values due to reduced degradation of the polypropylene chain). This is surprising, since if the change in stabilizing action were additive and therefore linear the activity of mixtures of components 1 and 2 would have been expected to be poorer than that of pure component 1 (Examples 5–7).

The invention claimed is:

1. Mixture comprising
   a) a compound of formula (II) [hereinafter termed component 1]

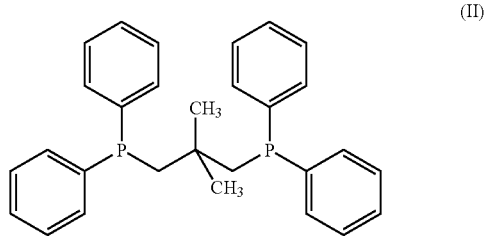

and b) at least one compound of the general formula (V) [hereinafter termed component 2]

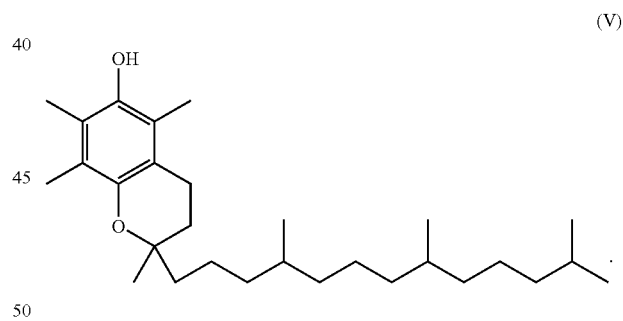

2. Mixture according to claim 1, where the quantitative ratio of formula (II) to formula (V) is from 50:1 to 2:1.

3. Mixture according to claim 1, where the quantitative ratio of formula (II) to formula (V) is from 20:1 to 1.5:1.

4. Mixture according to claim 1, where the quantitative ratio of formula (II) to formula (V) is from 15:1 to 1:1.

5. A composition comprising:
   at least one polymeric material; and
   a mixture according to claim 1.

* * * * *